(12) United States Patent
Lutnaes

(10) Patent No.: US 6,342,738 B1
(45) Date of Patent: Jan. 29, 2002

(54) MOBILE ELECTRONIC DEVICE WITH INTEGRATED DUAL HARDWARE/ SOFTWARE POWER SWITCH

(75) Inventor: Sturla Lutnaes, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/323,275

(22) Filed: Jun. 1, 1999

(30) Foreign Application Priority Data

Jun. 3, 1998 (SE) .............................................. 9801970

(51) Int. Cl.$^7$ ................................................. H04M 1/02
(52) U.S. Cl. ........................................ 307/125; 455/575
(58) Field of Search ........................ 307/125; 455/575; 379/433

(56) References Cited

U.S. PATENT DOCUMENTS

| | | | |
|---|---|---|---|
| 4,845,772 A | * 7/1989 | Metroka et al. ............ 379/433 |
| 5,148,471 A | 9/1992 | Metroka et al. |
| 5,175,759 A | 12/1992 | Metroka et al. |
| 5,436,954 A | * 7/1995 | Nishiyama et al. ......... 379/433 |
| 5,450,619 A | * 9/1995 | Maeda ........................ 379/433 |
| 5,461,672 A | * 10/1995 | Enokido et al. ............ 379/433 |
| 5,715,311 A | * 2/1998 | Sudo et al. ................. 379/428 |
| 5,898,933 A | * 4/1999 | Kaschke ..................... 455/575 |
| 6,115,620 A | * 9/2000 | Colonna et al. ............ 455/575 |
| 6,157,718 A | * 12/2000 | Kaschke ..................... 379/433 |

FOREIGN PATENT DOCUMENTS

GB  2 297 661  8/1996

* cited by examiner

Primary Examiner—Fritz Fleming
(74) Attorney, Agent, or Firm—Burns, Doane, Swecker & Mathis, L.L.P.

(57) ABSTRACT

A portable electronic device, such as a mobile telephone, can be switched on by opening out a flip. The device can be switched off by closing the flip and operating a key on a key pad which causes software to remove the power supply to the processor of the telephone.

9 Claims, 3 Drawing Sheets

MOBILE ELECTRONIC DEVICE WITH INTEGRATED DUAL HARDWARE/SOFTWARE POWER SWITCH

The present invention relates to a mobile electronic device, such as a mobile telephone or personal organizer or computer, etc., of the type mentioned in the preamble of the independent claims.

BACKGROUND

Many mobile electronic devices have a hinged front panel, henceforth called a flip, which can be opened when the device is used for certain functions and which can be closed in order to reduce the bulk of the device when these functions are not required. One example of such a device is the mobile telephone known from the patent GB-A 2 297 661 which has a flip which can be folded down to expose a touch screen display. When the flip is folded up against the touch screen display the screen can be operated by means of a keypad consisting of a plurality of buttons which extend through the flip and which can be pressed by a user into contact with the touch sensitive parts of the touch screen display. There is no electrical connection between these buttons on the flip and the main unit. There is a flip position indicating switch in the main body of the unit which can be operated by a switch activation device disposed in the flip. The flip position indicating switch and switch activation device co-operate to produce a mode change signal which is sent to the processor of the mobile phone and which indicates if the flip is open or closed. If the flip is closed a first set of functions is available to the user and if the flip is open a second set of functions is available to the user. Mobile telephones of this type can be switched on and off by a hardware switch which disconnects the processor from the logic voltage supply in order to minimize unnecessary battery drainage caused by the logic voltage supply leakage current. It is not possible to use the flip position indicating switch in the main body of the unit which is actuated by the switch activation device in the flip to, for example, disconnect the processor from its logic voltage supply as the telephone is intended to be used for certain functions even when the flip is closed. It is not possible to use software to switch on the processor as the processor is completely switched off and hence cannot run any software when it is disconnected from its power supply. Thus a separate hardware switch is required which increases the manufacturing costs and, as it introduces a potential failure path, also lowers the reliability of the mobile telephone.

An object of the present invention is to provide an improved portable electronic device in which the use of a separate hardware switch to switch on and off the processor is unnecessary.

SUMMARY

An object of the present invention is to simplify the manufacturing of portable electronic devices and to reduce their manufacturing costs.

Another object of the present invention is to improve the reliability of such devices.

The objects of the present invention are achieved by means of a portable electronic device in which the use of a separate hardware switch for switching on and off the device is unnecessary.

The portable electronic device in accordance with the present invention can be switched on by opening out the flip. This causes the flip position indicating switch to connect the processor to its power supply. When the processor is running it can keep the power supply connected by software means. With the flip open a first set of functions on the touch screen can be accessed by the user. The flip can be closed to access a second set of user functions. The action of closing the flip does not disconnect the processor from its power supply. One of the functions in the second set of user functions is an "off" function which is assigned to one of the keys of the keyboard. Activating this key causes the touch screen to register that the key has been pushed and causes the software to disconnect the processor from its power supply thereby shutting down the processor and removing it as a potential source of power leakage.

The invention will be explained in more detail by means of example of embodiments and with reference to the accompanying drawings.

DETAILED DESCRIPTION

Figure 1:
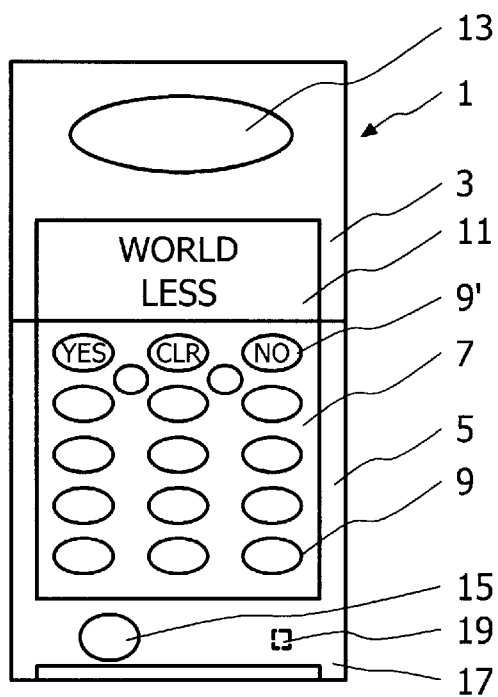
FIG. 1 shows a first embodiment of a mobile telephone with a closed flip in accordance with the present invention.

FIG. 1 shows a view from the front of a portable electronic device in the form of mobile telephone 1. Telephone 1 has a main body 3 and a part movable in relationship to the main body such as a flip 5 which is shown folded up against main body 3. Flip 5 has input means for example a key pad 7 with a plurality of keys 9 which each correspond to a desired function or number or letter. The function of each key 9 is determined by the software of the telephone 1 and when the flip is closed each key has a specific function assigned to it Main body 3 has information input means and information displaying means which preferably can be combined in to, for example, a touch screen display 11 which is partly obscured by flip 5 when flip 5 is folded up against main body 3. Main body 3 has a loudspeaker 13 and microphone 15. When the flip is closed and keys 9 are pressed by a user they push through the flip 5 and contact the portion of touch screen display 11 beneath them. The touch screen display 11 detects which key 9 has been pushed into contact with it and carries out the desired operation. Touch screen display 11 can also display information.

Figure 2:
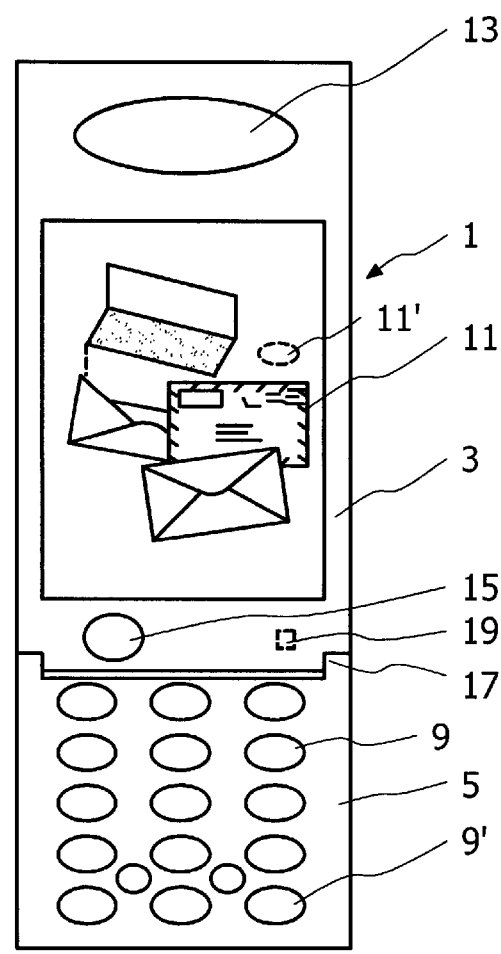
FIG. 2 shows the embodiment of a mobile telephone shown in FIG. 1 with an opened flip in accordance with the present invention.

FIG. 2 shows a view from the front of telephone 1 in which flip 5 has been folded down from main body 3 about hinge 17. Touch screen display 11 is now fully exposed. Hinge 17 contains a flip position indicating hinge switch 19 which is closed when flip 5 is open and which is open when flip 5 is closed. As flip 5 is no longer over the touch screen 11, keys 9 can no longer come into contact with touch screen 11 and have no function. Each part of the surface of the touch screen which is covered by one of the keys 9 when the flip is closed can be given different functions depending on whether the flip is open or closed.

Figure 3:
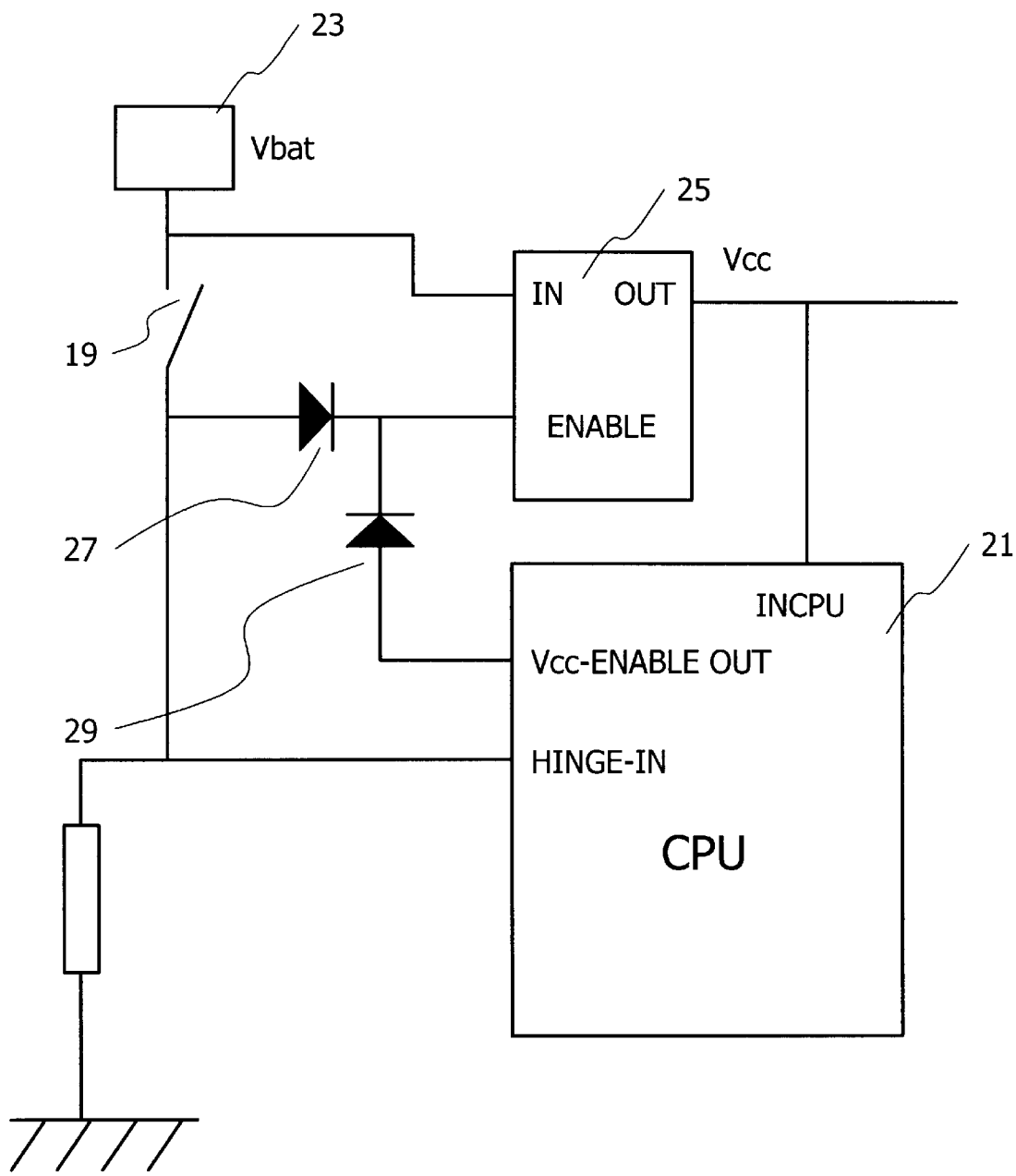
FIG. 3 shows an embodiment of a circuit for connecting and disconnecting a processor to a power supply in accordance with the invention when a hinge switch is open.

FIG. 3 shows an embodiment of a circuit for connecting and disconnecting a processor means such as central processor unit (CPU) 21 to a power supply such as battery 23. Battery 23 is connected to the input terminal IN of a voltage regulator 25 which can provide a logic voltage supply Vcc on an output terminal OUTPUT. Voltage regulator 25 is enabled to provide the logic voltage supply Vcc when it receives, for example, a high input voltage on its ENABLE terminal. The logic voltage supply Vcc can be applied to an input terminal IN-CPU on the CPU 21 and is used to run the CPU 21.

There are two ways shown of applying a high input voltage to the ENABLE terminal. The first way is by closing hinge switch 19 (which corresponds to opening the flip 5) which thereby allows the battery voltage to flow via the hinge switch 19 and a diode 27 to the ENABLE terminal. Thus whenever the flip is open the voltage regulator 25 is enabled and the logic voltage supply Vcc is provided to the CPU 21. The second way of applying an input voltage to the ENABLE terminal is to provide an enabling voltage from the CPU 21 to the ENABLE terminal. This is achieved by providing the CPU 21 with an output terminal Vcc-ENABLE-OUT which can be connected to the ENABLE terminal via a diode 29. The Vcc-ENABLE-OUT terminal is controlled by CPU 21 and can be used to maintain an input to the ENABLE terminal irrespective of the position of the hinge switch 19.

In FIG. 3 the hinge switch 19 is open which corresponds to the case when the flip 5 is closed. In a first case with the flip 5 closed the CPU 21 has been switched off therefore there is no output on the Vcc-ENABLE-OUT terminal, the voltage regulator 25 is not enabled to provide an output on the OUTPUT terminal and therefore the voltage regulator 25 has no output on its output terminal OUT. CPU 21 is therefore not being supplied with logic voltage supply Vcc and is not consuming any power.

Figure 4:
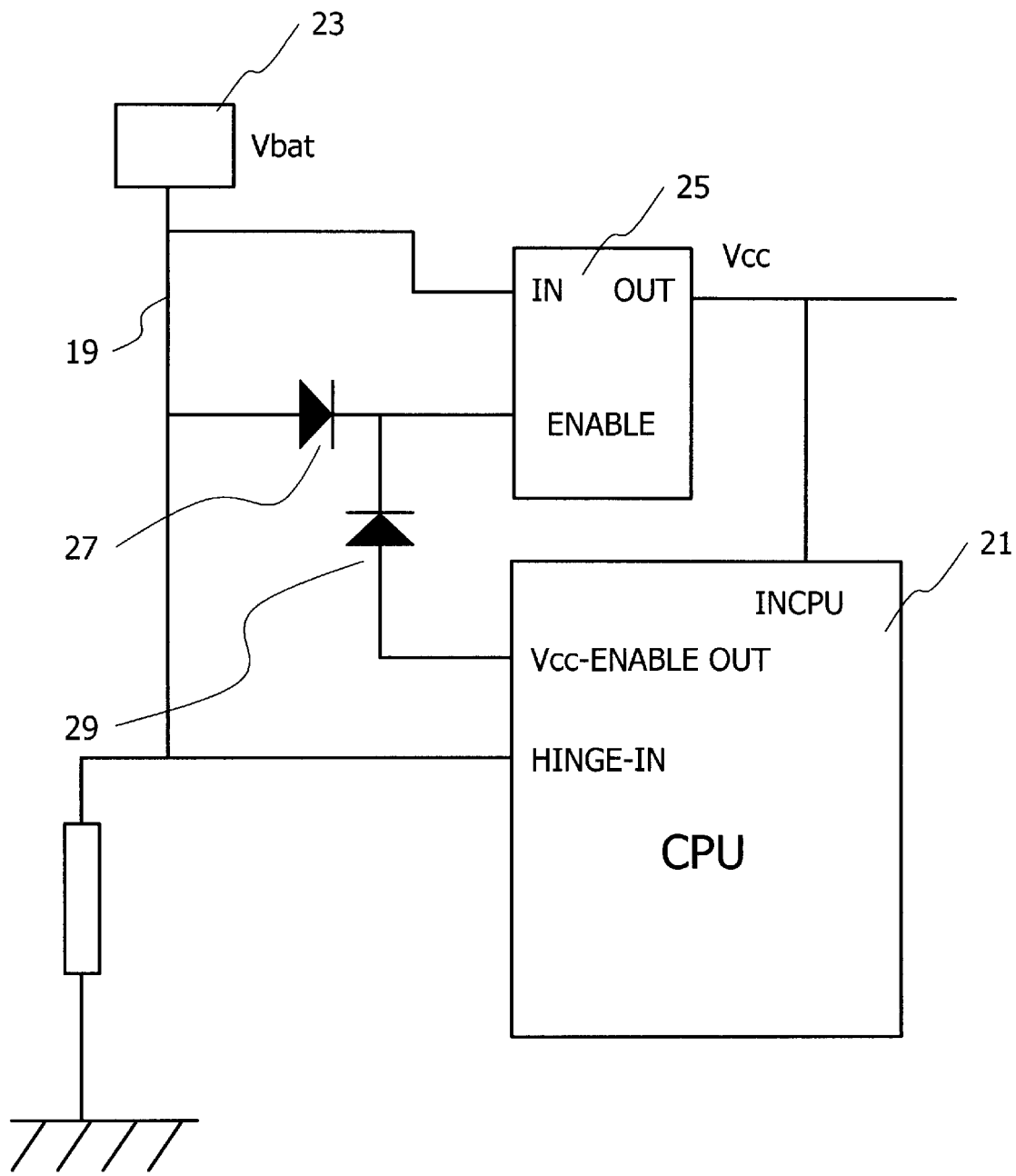
FIG. 4 shows the embodiment of FIG. 3 of a circuit for connecting and disconnecting a processor to power supply in accordance with the invention when the hinge switch is closed.

FIG. 4 shows the circuit of FIG. 3 when the hinge switch 19 is closed and the flip 5 is open. Power can now flow from battery 23 via hinge switch 19 to diode 27 and on to Vcc-ENABLE-IN. This enables voltage regulator 25 to output the logic voltage supply Vcc to the CPU 21. CPU is thereby activated and can run its software. In a preferred embodiment of the invention the CPU 21 is programmed to activate Vcc-ENABLE-OUT and thereby apply a voltage to the ENABLE terminal of voltage regulator 25 whenever switch 19 is closed. This is not strictly necessary to maintain the ENABLE terminal enabled as the closed hinge switch 19 also provides the ENABLE terminal with an enabling current. It is therefore not possible to switch off the logic voltage supply Vcc to the CPU 21 when the flip 5 is open. CPU 21 is also provided with a signal on a HINGE-IN terminal which informs the CPU 21 that the hinge switch is closed which means that the flip 5 is open and that a second set of operations is assigned to the keys 9.

If the flip is now closed then the hinge switch 19 will open and the circuit will again look the same as in FIG. 3. There is however an important difference, namely that the ENABLE terminal is being provided with an enabling current from Vcc-ENABLE-OUT from the CPU 21 which maintains the voltage regulator 25 enabled and thereby maintains the logic voltage supply Vcc to the CPU 21. When the flip 5 is closed the hinge switch 19 is opened and the signal on a HINGE-IN terminal which informs the CPU 21 that the hinge switch is closed is removed. This informs the CPU 21 that the flip 5 is closed and accordingly CPU 21 assigns a first set of operations to the keys 9. One (or more) of the keys 9 is assigned an OFF function by the software of CPU 21. If this key 9' is pushed then the CPU 21 detects that the part 11' of the touch screen 11 under this key 9' has been contacted and prepares to shut down. This part 11' of the touch screen 11 can be assigned another function when the flip is open, thereby preventing the device from being switched off while the flip is open. Once the software of CPU 21 is ready to shut down it disables the output of Vcc-ENABLE-OUT terminal. This removes the current to the ENABLE terminal on the voltage regulator 25 which ceases to provide the logic voltage supply to the CPU 21. CPU 21 is thereby shut down and does not consume any power.

In this way switching on of the telephone by hardware is obtained without requiring any special on/off hardware switch, while switching off of the telephone is achieved by means of software.

While the invention has been illustrated by a mobile telephone with a hinge switch it is also possible to use other flip position sensing means such as mutually co-operating proximity sensing means such as a magnet and reed switch or Hall-effect detector provided on the main body and flip.

While the invention has been illustrated by the example of a mobile telephone with a flip hinged to a main body and means for sensing whether the flip is in an open or closed position it is also conceivable to use the inventive concept of the present invention in devices in which a flip is not hinged to a main body. For example it is possible that in a device such as a personal organiser a part with a keypad could be completely detached from a main body with a display screen in order to provide a comfortable spatial relationship between the two parts for inputting data. In this case the main body and/or keyboard could be provided with proximity sensing means which fulfil the functions of the hinge switch mentioned above.

While the advantages of the invention are most fully realized when no separate hardware switch is used to switch the processor on and off, it is also possible to provide the device with a separate hardware switch if so desired in order to control the power supply to some other component of the device as well as the processor. For example if the device is a computer for use in extremely hot environments it may be provided with a cooling fan which it may be desirable to be able to operate independently of the processor. Thus when the processor is switched off by software the fan may still be powered up to provide cooling air until the processor has cooled below a certain temperature.

What is claimed is:

1. Portable electronic device comprising a main body, a part movable in relationship to said main body from a first position close to said main body to a second position further away from said main body, sensing means for determining in which of said positions said part is in, a processor, a power supply and power supply regulating means for connecting and disconnecting said power supply to said processor means, wherein said power supply regulating means can be enabled in order to connect said power supply to said processor means by signals originating from said processor means and said sensing means when in said second position and only by signals originating from said processor means when in said first position.

2. Portable electronic device according to claim 1, wherein when said part is moved from said first position to said second position, then said sensing means emits a signal to said power supply regulating means in order to connect said power supply to said processor means.

3. Portable electronic device according to claim 1, wherein when said part has been moved from said second position to said first position, then said processor means emits a signal to said power supply regulating means in order to maintain said power supply to said processor means while said sensing means ceases to emit a signal to said power supply regulating means.

4. Portable electronic device according to claim 1, further comprising user-operable input means which can order said processor means to cease to emit an enabling signal to said power supply regulating means when said part is in said first position.

5. Portable electronic device according to claim 1, wherein said sensing means is a hinge switch.

6. Portable electronic device according to claim 1, wherein said part is a flip connected by a hinge to said main body.

7. Portable electronic device according to claim 1, wherein it is a telephone.

8. Method for controlling the power supply regulating means to the processor means of a portable electronic device, comprising the steps of:

sensing if a part of said devices is in a first position or a second position with respect to the main body of said device;

when said part is moved into said first position, enabling said power supply regulating means in order to connect said power supply to said processor means only if signals originate from said processor means and only if said processor means were connected to said power supply before being moved into said first position; and, when said part is in said second position, enabling said power supply regulating means in order to connect said power supply to said processor means by signals originating from said processor means and said sensing means.

9. Method according to claim 8, further comprising the steps of:

providing user-operable input means which can order said processor means to cease to emit an enabling signal to said power supply regulating means when said part is in said first position; and ceasing to emit an enabling signal to said power supply regulating means when said parts is in said first position and after said user-operable input means has been operated.

* * * * *